United States Patent
Schwarzenegger et al.

(10) Patent No.: US 6,540,910 B2
(45) Date of Patent: Apr. 1, 2003

(54) RECIRCULATION OF WASTEWATER IN A FILTRATION BED

(76) Inventors: Ewald F. Schwarzenegger, 24 Joel M. Austin Rd., Cairo, NY (US) 12413; Darrin C. Elsom, 1014 Rte. 23A, Apt. 12, Catskill, NY (US) 12414

(*) Notice: Subject to any disclaimer, the term of this patent is extended or adjusted under 35 U.S.C. 154(b) by 13 days.

(21) Appl. No.: 09/934,667

(22) Filed: Aug. 23, 2001

(65) Prior Publication Data

US 2003/0038067 A1 Feb. 27, 2003

(51) Int. Cl.[7] ............................ B01D 24/24; C02F 3/04; C02F 3/30
(52) U.S. Cl. .................. 210/151; 210/170; 210/195.1; 210/196; 210/292; 210/299; 210/532.2
(58) Field of Search ................. 210/150, 151, 210/170, 292, 299, 532.3, 194, 195.1, 196

(56) References Cited

U.S. PATENT DOCUMENTS

| | | | |
|---|---|---|---|
| 1,794,841 A | * 3/1931 | Elfreth | 210/292 |
| 2,308,866 A | 1/1943 | Dikema | |
| 3,814,245 A | 6/1974 | Hirs | |
| 3,956,128 A | 5/1976 | Turner | |
| 3,968,034 A | * 7/1976 | Tymoszczuk | 210/151 |
| 4,036,754 A | * 7/1977 | Peasley | 210/151 |
| 4,039,451 A | 8/1977 | Smith | |
| 4,251,359 A | * 2/1981 | Colwell et al. | 210/151 |
| 4,895,645 A | * 1/1990 | Zorich, Jr. | 210/176 |
| 5,462,666 A | 10/1995 | Kimmel | |
| 5,480,561 A | * 1/1996 | Ball et al. | 210/196 |
| 5,609,754 A | * 3/1997 | Stuth | 210/532.2 |
| 5,676,828 A | * 10/1997 | Kallenbach et al. | 210/196 |
| 5,725,766 A | 3/1998 | Deskins | |
| 5,958,239 A | * 9/1999 | Sing | 210/170 |
| 5,989,416 A | * 11/1999 | Gorton | 210/151 |
| 6,051,137 A | 4/2000 | Deskins | |
| 6,238,563 B1 | * 5/2001 | Carroll, II et al. | 210/151 |
| 6,270,661 B1 | * 7/2001 | Jowett | 210/170 |
| 6,464,865 B2 | * 10/2002 | Tipton et al. | 210/532.2 |

* cited by examiner

*Primary Examiner*—Christopher Upton
(74) *Attorney, Agent, or Firm*—Heslin Rothenberg Farley & Mesiti P.C.

(57) ABSTRACT

In a filtration system wherein wastewater is recirculated back through a filtration bed for a second pass therethrough, the recirculated wastewater being directed through a set of secondary distribution pipes located in the filtration bed below those distribution pipes through which the wastewater is first carried through the bed, with hood elements arched over the respective secondary pipes.

7 Claims, 3 Drawing Sheets

RECIRCULATION OF WASTEWATER IN A FILTRATION BED

BACKGROUND OF THE INVENTION

Recirculation of a portion of outlet wastewater from a filtration bed is a known concept. More specifically, it is known to divide the outlet flow from a filtration bed so that some of the emerging wastewater is discharged in the usual manner and some is carried back to pass once again through the filtration bed. One form of such recirculation is described in U.S. Patent No. 4,039,451 wherein some of the outlet flow from a filtration bed is carried back for a second pass through the bed.

In the recirculation process of that reference, and in all known forms of relevant recirculation, the recirculated wastewater passes through the very same path in the filtration bed that it did on its initial pass. As a consequence the total wastewater passing through the filtration bed is a single mixture of wastewater making its first pass plus recirculated wastewater sent back for a repeat pass.

The principal object of the present invention is to improve upon the treatment capability of these known filtration systems which involve recirculation of some of the output wastewater from the filtration bed.

SUMMARY OF THE INVENTION

The invention provides an improvement in a filtration system wherein wastewater from a septic tank is directed into perforated primary distribution pipes on an upper surface of a filtration bed of granular material, through which bed some of the wastewater from the primary pipes descends to perforated collection pipes at a low level in the filtration bed. Wastewater emerging from the collection pipes is directed through flow divider means from which some wastewater is discharged and the remaining wastewater is recirculated back through the filtration bed. The improvement provides perforated secondary distribution pipes into which that remaining wastewater is recirculated at a level in the filtration bed below the primary pipes and above the collection pipes. Respective coextensive perforated hood elements are arched over the respective secondary pipes to space them from the granular material above and to each side.

The primary pipes are preferably substantially parallel to one another and the secondary pipes are also preferably substantially parallel to one another and to the primary pipes. The hood elements may be of plastic.

The granular material may comprise a first layer of coarse sand at an upper level of the filtration bed under the primary distribution pipes, a second layer of pea gravel under the coarse sand and surrounding the secondary pipes, a third layer of fine particulate material such as sand under the pea gravel and a fourth layer of clean gravel under the fine sand and surrounding the collection pipes. The secondary pipes and the associated hood elements are within the pea gravel layer in the preferred form of the invention.

The direction of flow of wastewater in the primary distribution pipes may be opposite to the direction of flow in the secondary pipes.

DESCRIPTION OF THE PREFERRED EMBODIMENT

The improvement of this invention is in what is called an open-type filtration bed used in a filtration system, and the components of the system upstream and downstream of that open filtration bed are generally conventional. These upstream and downstream components of the filtration system will be described first in somewhat summary fashion with respect to the flow diagrams of each of FIGS. 1 and 2.

Figure 1:
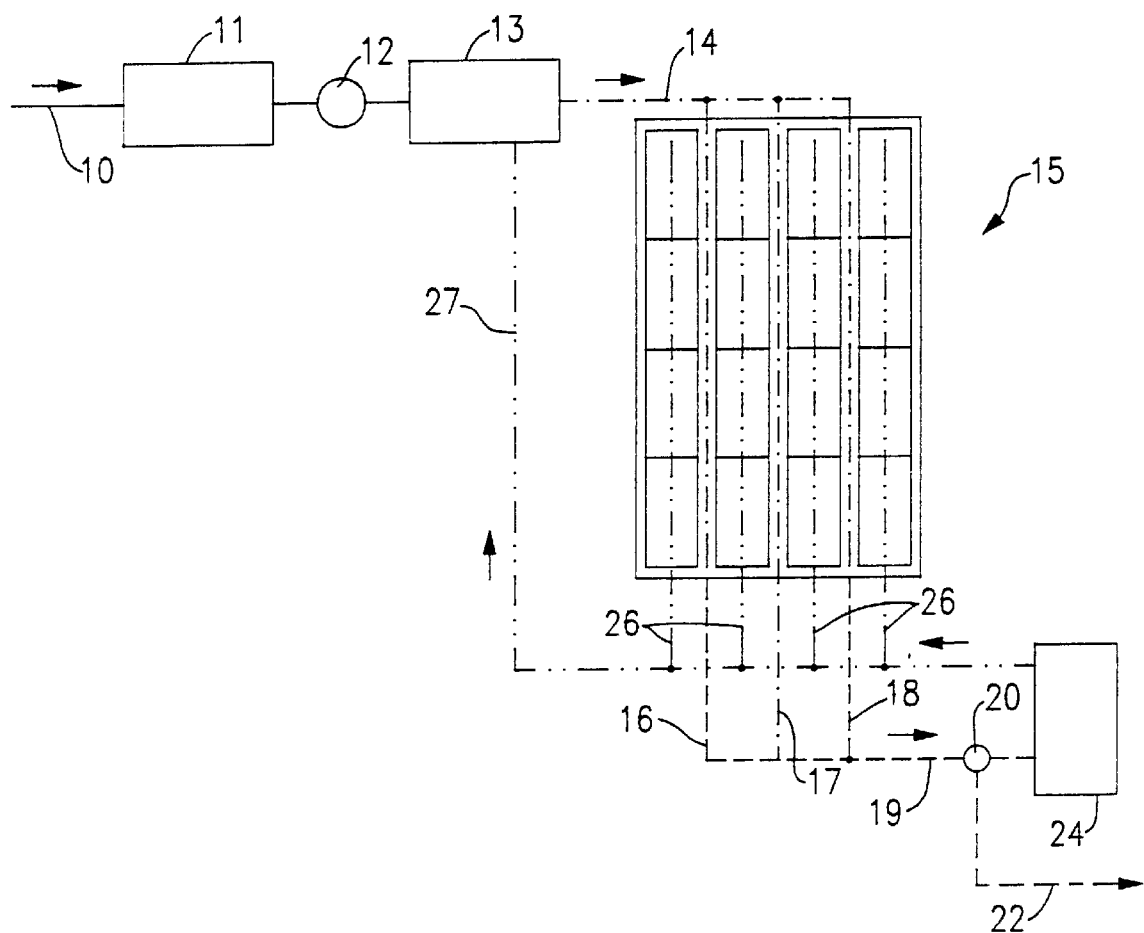
FIG. 1 is a schematic flow diagram of one form of the filtration bed recirculation system according to the invention.

Referring first to FIG. 1, raw wastewater or sewage effluent flows through a conduit 10 into a septic tank 11. Effluent from the septic tank 11 then passes through a filter 12 and enters a dousing chamber 13 from which it is pumped through a primary distribution manifold 14 into a filtration bed 15. The form and function of the filtration bed 15 are the principal subject of this invention and will be described hereinafter.

From the filtration bed 15 wastewater is carried into output collection conduits 16, 17 and 18 which together feed into a collection system manifold 19. From the manifold 19 the wastewater enters flow divider means which in this embodiment is a conventional splitter 20. From it some wastewater is carried through a discharge conduit 22 to a subsurface disposal field or the like or disinfected prior to surface discharge. The remaining wastewater exiting from the splitter 20 is directed into a recirculation chamber 24 and is returned to the filtration bed 15 through a main recirculation conduit 25 and branch recirculation conduits 26. If desired, some of the recirculated wastewater may also be carried through a bypass conduit 27 back to the dousing chamber 13.

In the alternative flow diagram of FIG. 2 wastewater again passes through a septic tank 30 and a filter 31 to a dousing chamber 32 and thence to a primary distribution manifold 33. From the primary manifold 33 the wastewater is directed in this embodiment through inlet valves 34 and 35 into individual filtration beds 36 and 37. From these beds 36 and 37 the wastewater passes through output collection conduits 38 and 39. Some of the wastewater can be directed through outlet valves 41 and 42 to a discharge conduit 44. The remaining wastewater can be directed through output valves 46 and 47 to a recirculation chamber 48. The pair of output valves 41 and 42 and the other pair of outlet valves 46 and 47 are opened and closed as needed to direct the wastewater either to the discharge conduit 44 or to the recirculation chamber 48 and they function as what is referred to herein as flow divider means.

From the recirculation chamber 48 the recirculated portion of wastewater passes through a main recirculation conduit 49 for reentry into the filtration beds 36 and 37 through branch recirculation conduits 50. Again, some of the recirculated wastewater may be carried through a bypass conduit 52 back to the dousing chamber 32.

Figure 2:
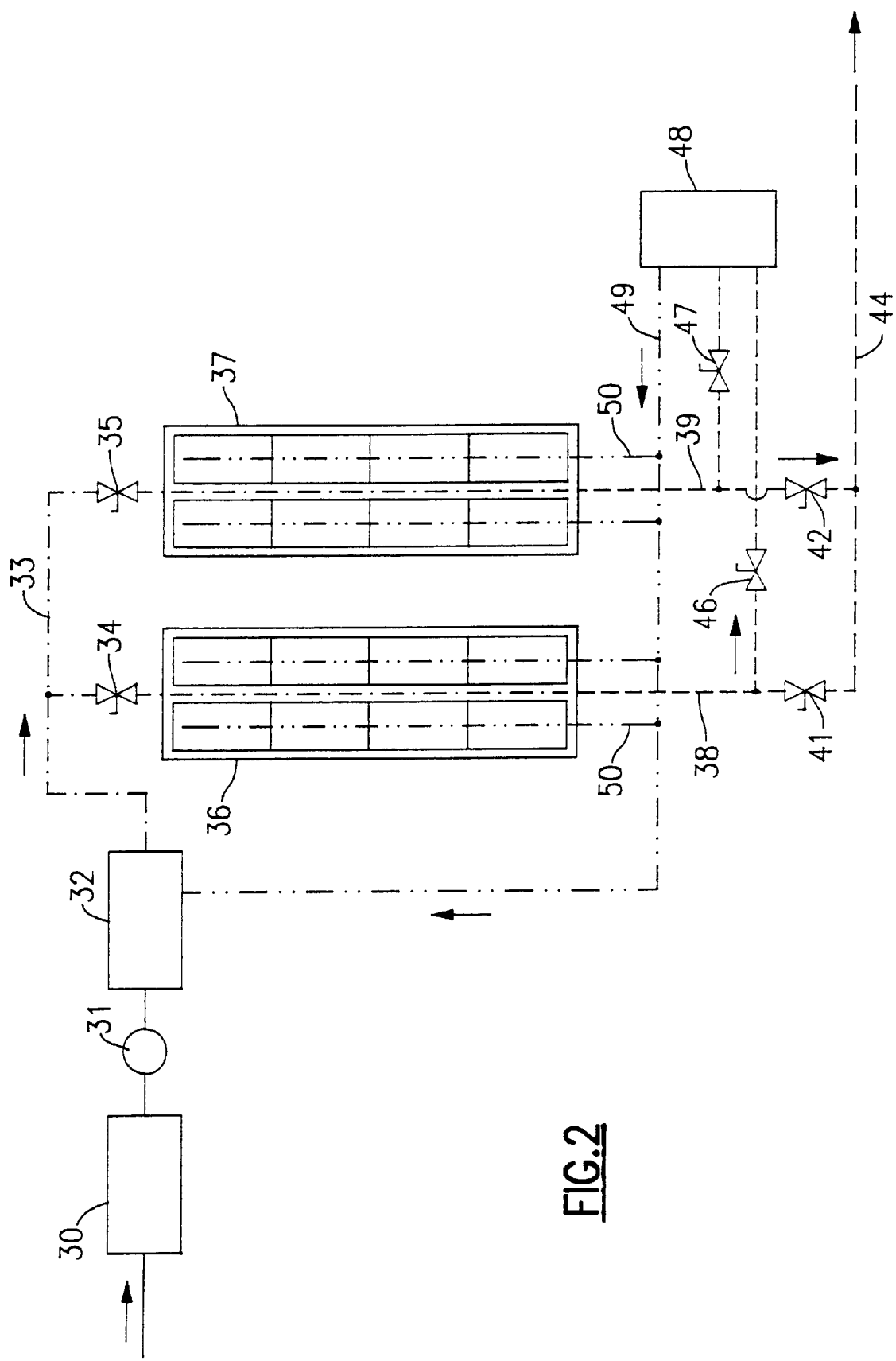
FIG. 2 is a schematic flow diagram of an alternate form of the filtration bed recirculation system according to the invention.

It is to be understood that the filtration beds 36 and 37 of the FIG. 2 embodiment can be operated at the same time in parallel in a manner very similar to the system of FIG. 1. Alternatively, the filtration beds of FIG. 2 can be operated alternately and in sequence simply by appropriate adjustment of the various valves. This can be beneficial for sites with a variable flow pattern and it allows for easy maintenance and system rejuvenation.

Figure 3:
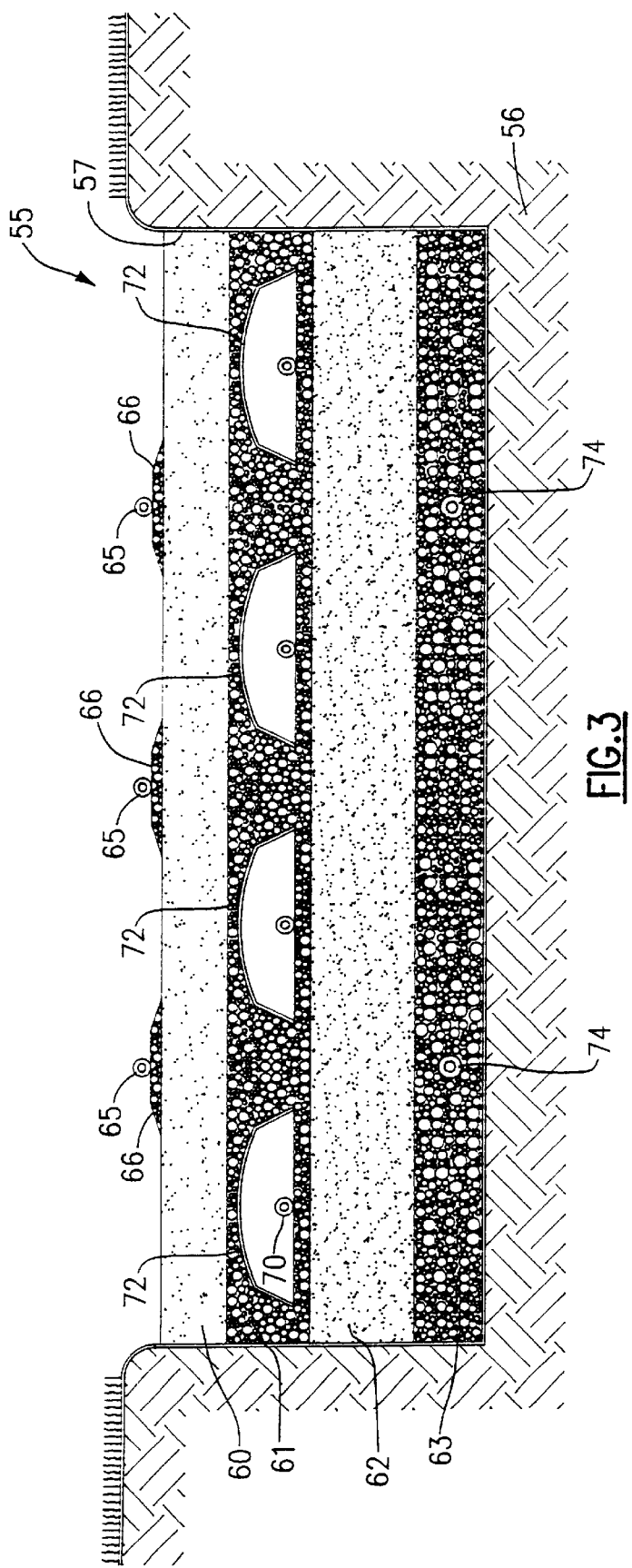
FIG. 3 is a cross section taken laterally through the filtration bed of either of the foregoing forms of the system.

The improvement of the invention will now be described in relation to FIG. 3 where an open filtration bed 55 may be either the single filtration bed 15 of FIG. 1 or one of the multiple filtration beds 36 and 37 of FIG. 2.

In undisturbed earth 56 an elongated pit is prepared which is lined with an impermeable plastic sheet 57 preferably of polyvinylchloride. Four principle layers of granulated material are disposed in the pit. At the top surface of the pit is a first layer 60 of coarse sand approximately 12 inches thick. Below that is a second layer 61 of pea gravel approximately 14 inches thick. Next and below that is a third layer 62 of fine sand also about 14 to 24 inches thick. At the bottom is a fourth layer 63 of clean gravel about 12 to 18 inches thick.

Figure 4:
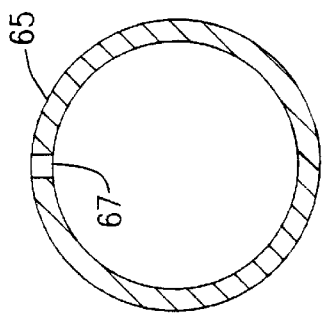
FIG. 4 is an enlarged lateral section through one of the primary pipes showing one of the perforations in its wall.

Primary distribution pipes 65, centered along respective thin narrow gravel strips 66 for splash protection, are in parallel on the upper surface of the first coarse sand layer 60. (Three pipes 65 are shown but that number can vary, as in FIG. 2 wherein the respective inlet valves 34 and 35 lead to only one primary distribution pipe in each of the beds 36 and 37.) The primary distribution pipes 65 are of plastic such as polyvinyl chloride and they are typically about 2 inches in inside diameter with a wall thickness of about 0.25 inch. They are perforated with a multiplicity of small holes 67 at the top of their wall typically of 0.25 inch diameter spaced about 5 feet apart. One of these holes 67 is shown in the sectional view of FIG. 4. All wastewater entering the primary pipes 65 exits upwardly through these perforations. They may be capped at their outer ends to insure that this happens.

As noted previously some wastewater is recirculated back to the filtration bed 15 of FIG. 1 or the filtration beds 36 and 37 of FIG. 2. In accordance with the invention that recirculated wastewater is not returned to the primary pipes 65 but enters parallel secondary distribution pipes 70 which may be of about the same size and perforated and capped at their outer ends in the same way as the primary pipes 65. All wastewater entering the secondary pipes 65 exits upwardly through these perforations. The direction of flow of the wastewater in the primary pipes 65 may be opposite to the direction of flow in the secondary pipes 70.

Figure 5:
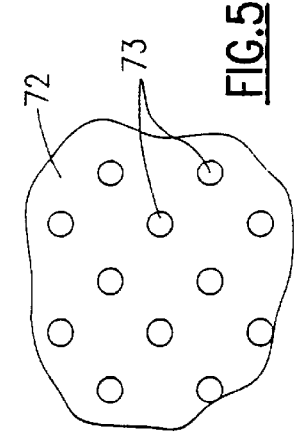
FIG. 5 is an enlarged fragmentary view of one of the hood elements over one of the secondary pipes showing the perforation holes in the hood element.

The secondary distribution pipes 70 are located within the second layer 61 of pea gravel. Each secondary pipe 70 lies over a flat surface of the pea gravel and arched over each pipe 70 is a coextensive plastic hood element 72. As shown in FIG. 5 the hood elements 72 are perforated with a multiplicity of small holes 73 of about 0.25 inch diameter arranged perhaps with 3 holes per square inch to permit downward passage of wastewater from the primary distribution pipes above. The hood elements 72 are in the form of inverted troughs. In a simpler form each hood element 72 could be one-half of a pipe of circular cross-section cut along its longitudinal centerline. Also, the hood elements 72 could be pressurized to force additional oxygen into the system.

In the fourth and lowest layer 63 of clean gravel are collection pipes 74 two of which are shown but there could be more. They are of polyvinyl chloride and perforated with a multiplicity of small holes in their wall in the same manner as the primary pipes 65 and the secondary pipes 70, and they may be of slightly larger diameter and wall thickness as compared to the primary and secondary pipes 65 and 70. All of the wastewater from the primary pipes 65 and the secondary pipes 70 descends through the successive layers of the filtration bed 55 until that wastewater reaches the collection pipes 74 into which it enters through their wall perforations. The wastewater then is carried from the collection pipes 74 to the collection system manifold 19 of the FIG. 1 embodiment or the collection conduits 38 and 39 of the FIG. 2 embodiment.

In operation all wastewater descending into the third fine sand layer 62 is a mixture of initial wastewater which made only a single pass through the primary pipes 65 plus partially treated wastewater which had made one or more repeat passes through the secondary pipes 70. This mixture is less strong than the initial wastewater and hence lesser biomat formation will occur on the third fine sand layer 62 than would be created by the untreated initial wastewater alone. Also, the hood elements 72 over the respective secondary pipes 70 provide void spaces in which highly aerobic conditions are present and this enhances the treatment of initial wastewater descending from the primary pipes 65 through the second layer 61 of pea gravel toward the third fine sand layer 62. By varying the granular sizes in the respective layers 60 to 63 and the input rate of initial wastewater in the primary pipes 65 relative to the recirculation rate in the secondary pipes 70, it is possible to vary the design to suit site-specific conditions.

The scope of the invention is to be determined by the following claim rather than the foregoing description of the preferred embodiment.

What is claimed is:

1. In a filtration system wherein wastewater from a septic tank is directed into perforated primary distribution pipes on an upper surface of a filtration bed of granular material, through which bed the wastewater from the primary pipes descends to perforated collection pipes at a low level in the filtration bed, and wastewater emerging from the collection pipes is then directed through flow divider means from which some wastewater is discharged and remaining wastewater is recirculated back through said filtration bed, the improvement comprising a) perforated secondary distribution pipes into which said remaining wastewater is recirculated at a level in the filtration bed below the primary pipes and above the collection pipes, and b) respective coextensive perforated hood elements arched over the respective secondary pipes spacing them from the granular material above and to each side.

2. A filtration system according to claim 1 wherein the primary pipes are substantially parallel to one another and the secondary pipes are also substantially parallel to one another and to the primary pipes.

3. A filtration system according to claim 2 wherein the hood elements are of plastic.

4. A filtration system according to claim 1 wherein the direction of flow of wastewater in the primary distribution pipes is opposite to the direction of flow in the secondary distribution pipes.

5. A filtration system according to claim 1 wherein the granular material comprises a first layer of coarse sand at an upper lever of the filtration bed, a second layer of pea gravel under the coarse sand, a third layer of fine sand under the pea gravel and a fourth layer of clean gravel under the fine sand and surrounding the collection pipes.

6. A filtration system according to claim 5 wherein the primary pipes are on the coarse sand layer and the secondary pipes are within the lower pea gravel layer.

7. In a filtration system wherein wastewater from a septic tank is directed into substantially parallel perforated primary distribution pipes on an upper surface of an upper coarse sand layer over a second lower layer of pea gravel and a third lower layer of fine sand and a fourth lower layer of clean gravel, said layers together comprising a filtration bed through which bed the wastewater from the primary pipes descends to perforated collection pipes in the fourth layer of clean gravel, and wastewater emerging from the collection pipes is then directed through flow divider means from which some wastewater is discharged and remaining wastewater is recirculated back through said filtration bed, the improvement comprising a) substantially parallel perforated secondary distribution pipes through which said remaining wastewater is recirculated in the second lower layer of pea gravel substantially parallel to the primary pipes, b) the direction of flow of wastewater in the primary distribution pipes being opposite to the direction of flow in the secondary distribution pipes, and c) respective coextensive perforated plastic hood elements arched over the respective secondary pipes spacing them from the pea gravel above and to each side.

* * * * *